(12) United States Patent
Lock et al.

(10) Patent No.: US 7,761,474 B2
(45) Date of Patent: Jul. 20, 2010

(54) INDEXING STORED DATA

(75) Inventors: Hendrik C. R. Lock, Dettenheim (DE); Daniel Booss, Wiesloch (DE)

(73) Assignee: SAP AG, Walldorf (DE)

( * ) Notice: Subject to any disclaimer, the term of this patent is extended or adjusted under 35 U.S.C. 154(b) by 1283 days.

(21) Appl. No.: 10/881,709

(22) Filed: Jun. 30, 2004

(65) Prior Publication Data

US 2006/0004715 A1  Jan. 5, 2006

(51) Int. Cl.
G06F 17/30 (2006.01)
(52) U.S. Cl. .................................... 707/797; 707/956
(58) Field of Classification Search .................. 707/3, 707/5, 100, 101, 102
See application file for complete search history.

(56) References Cited

U.S. PATENT DOCUMENTS 5,089,952 A * 2/1992 Bozman ............... 710/200
5,724,605 A * 3/1998 Wissner ................ 707/104.1
5,758,356 A    5/1998 Hara et al.

(Continued)

OTHER PUBLICATIONS

Tolga Bozkaya, et al., "Indexing Valid Time Intervals", Paper, Computer Engineering and Science Department, Case Wenster Reserve University, 18 pages, Date 1998.

(Continued)

Primary Examiner—Charles Rones
Assistant Examiner—Rezwanul Mahmood
(74) Attorney, Agent, or Firm—Schwegman, Lundberg & Woessner, P.A.

(57) ABSTRACT

Methods and apparatus, including computer program products, for providing a data structure, embodied in a computer-readable medium, implementing a tree of nodes having inner nodes and leaf nodes, and performing a scan of the data structure to identify an entry that satisfies a search criterion. Each leaf node includes a key having a first value representing a starting point of an interval, a second value representing an ending point of an interval, and a third value representing a duration of an interval. Each inner node is a root node of a subtree. Each inner node includes a key having a first value representing a minimum of the starting points of intervals in the corresponding subtree, a second value representing a maximum of the ending points of the intervals in the corresponding subtree, and a third value representing a maximum duration of the intervals in the corresponding subtree.

20 Claims, 5 Drawing Sheets

U.S. PATENT DOCUMENTS

| | | | |
|---|---|---|---|
| 5,778,371 A | 7/1998 | Fujihara | |
| 5,862,385 A * | 1/1999 | Iitsuka | 717/156 |
| 5,864,867 A | 1/1999 | Krusche et al. | |
| 5,940,833 A | 8/1999 | Benson | |
| 6,219,667 B1 | 4/2001 | Lu et al. | |
| 6,282,533 B1 | 8/2001 | Ramaswamy et al. | |
| 6,757,686 B1 | 6/2004 | Syeda-Mahmood et al. | |
| 6,985,143 B2 * | 1/2006 | Pharr | 345/421 |
| 7,007,030 B2 | 2/2006 | Zibin et al. | |
| 7,072,958 B2 * | 7/2006 | Parmar et al. | 709/223 |
| 7,162,480 B2 | 1/2007 | Vishik | |
| 7,281,002 B2 * | 10/2007 | Farrell | 707/3 |
| 2002/0123987 A1 * | 9/2002 | Cox | 707/3 |
| 2003/0078935 A1 | 4/2003 | Zibin et al. | |
| 2004/0204978 A1 | 10/2004 | Rayrole | |
| 2004/0210592 A1 | 10/2004 | Ciolfi et al. | |
| 2004/0230596 A1 | 11/2004 | Veitch et al. | |
| 2005/0050060 A1 * | 3/2005 | Damm et al. | 707/100 |
| 2005/0071322 A1 | 3/2005 | Chen et al. | |
| 2005/0198008 A1 | 9/2005 | Alder | |
| 2006/0026188 A1 | 2/2006 | Najork et al. | |
| 2006/0129580 A1 | 6/2006 | Haft et al. | |
| 2006/0212462 A1 | 9/2006 | Heller et al. | |

OTHER PUBLICATIONS

Hans-Peter Kriegel, et al., "Managing Intervals Efficiently in Object-Relational Databases", Proceedings of the 26th International Conference on Very Large Databases, Cairo, Egypt, 2000, 12 pages.

Chuan-Heng Ang, et al. "The Interval *B*-tree", Elsevier Science B.V., Information Processing Letters 53, (1995) pp. 85-89.

* cited by examiner

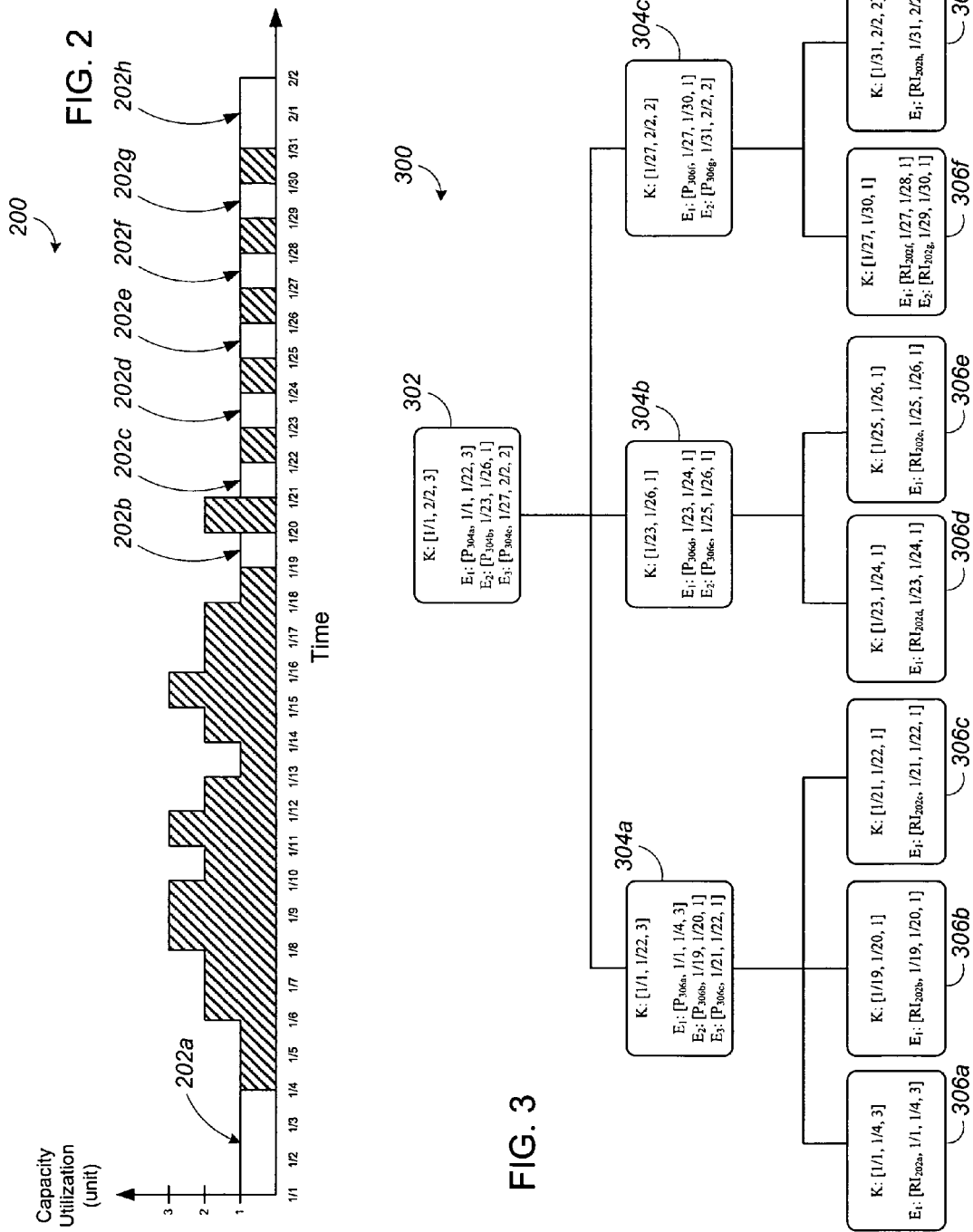

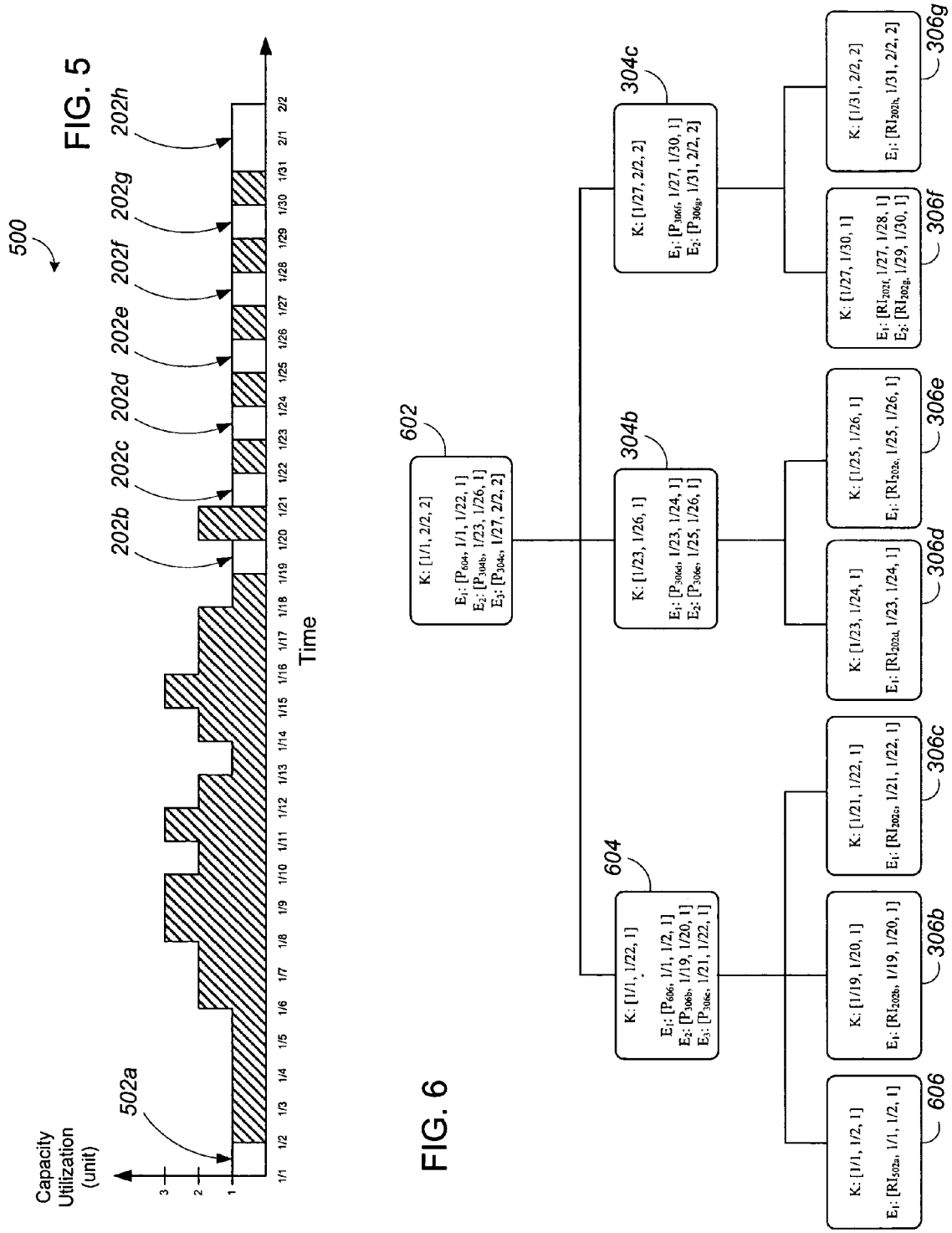

INDEXING STORED DATA

BACKGROUND

This description relates to indexing stored data.

Data records in a relational database management system (RDBMS) are maintained in tables, which are a collection of rows all having the same columns. Each column maintains information on a particular type of data for the data records which include the rows. One or more indexes may be associated with each table. An index is an ordered set of pointers to data records in the table based on the data in one or more columns of the table. An index includes rows or index entries which include an index key and a pointer to a database record in the table having the key column values of the index entry key.

Index entries are often stored in a B-tree data structure. A B-tree includes a single root node and a number of leaf and branch nodes. The leaf nodes store the index entries. Each index entry includes key values and the physical address or identifier of the row or record in the database table which has the key values in its key columns. A branch node stores key values and pointers to other branch nodes. An index may be searched for matching key values by an index scan. A scan of the index traverses from the root node down to the leaf node looking for the index entries that have the matching keys. The nodes which store the index entries are maintained in a storage device, such as a hard disk drive or other non-volatile memory accessible to the database program.

A query can be made against an index to retrieve one or more index keys using a search key that includes values for each of the key columns. The search locates the first index entry that has a key value that matches the search key, i.e., the values in the key columns in the search key match the values for the key columns in the index entry.

SUMMARY

The techniques described in this specification provide methods and apparatus, including computer program products, for providing a data structure embodied in a computer-readable medium, the data structure implementing a tree of nodes having a plurality of inner nodes and a plurality of leaf nodes.

Each leaf node includes a key having a first value representing a starting point of an interval, a second value representing an ending point of an interval, and a third value representing a duration of an interval. Each inner node is a root node of a subtree. Each inner node includes a key having a first value representing a minimum of the starting points of intervals in the corresponding subtree, a second value representing a maximum of the ending points of the intervals in the corresponding subtree, and a third value representing a maximum duration of the intervals in the corresponding subtree.

Each node can include an entry having a pointer to a record in a database table, the record defining an interval, a first value representing a starting point of the interval, a second value representing an ending point of the interval, and a third value representing a duration of the interval. Each node can include an entry having a pointer to a child node, a first value representing a minimum of the starting points of intervals in a subtree having the child node as its root node, a second value representing a maximum of the ending points of the intervals in the subtree having the child node as its root node, and a third value representing a maximum duration of the intervals in the subtree having the child node as its root node. An interval can represent an available slot in a capacity profile of a resource.

The techniques can include performing a scan of the data structure to identify an entry that satisfies a search criterion. The search criterion can include one or more of a duration of a query, an earliest starting point of a query interval, a latest starting point of the query interval, an earliest ending point of the query interval, a latest ending point of the query interval, and a search direction.

When the search criterion includes a duration of a query, a starting point of a query interval and a forward search direction, the techniques for performing a scan of the data structure can include traversing a leftmost path from a root node of the tree through one or more nodes to identify an entry that satisfies the search criterion. The techniques for traversing the leftmost path can include scanning a node by identifying the entries in the node of sufficient duration, and having a second value greater than or equal to the starting point of the query interval, and selecting, from among the identified entries in the node, the entry having the smallest of the second values. If the selected entry includes a pointer to a record in a database table, the techniques can include determining whether the interval of the selected entry satisfies the slot search criterion, and if so, identifying the selected entry as satisfying the search criterion. If the selected entry includes a pointer to a child node, the techniques can include traversing a path downwards to the child node, and repeating the scanning at the child node.

If none of the entries in the node are of sufficient duration and have a second value greater than or equal to the starting point of the query interval, the techniques can include traversing a shortest direct path upwards, from the node towards the root node of the tree, through one or more ancestor nodes to identify one or more entries of an ancestor node having a first value greater than or equal to the starting point of the query interval and a third value greater than or equal to the duration of the query, and selecting, from among the identified entries in the ancestor node, the entry having the smallest of the first values. If the selected entry includes a pointer to a record in a database table, the techniques can include determining whether the interval of the selected entry satisfies the slot search criterion, and if so, identifying the selected entry as satisfying the search criterion. If the selected entry includes a pointer to a child node, the techniques can include traversing a path downwards to the child node, and repeating the scanning at the child node.

To determine whether an entry is of sufficient duration, the techniques can include determining whether a value representing a difference between the second value of the entry and the starting point of the query interval is greater than or equal to the duration of the query.

When the search criterion includes a duration of a query, an ending point of a query interval and a backward search direction, the techniques to perform the scan can include traversing a rightmost path from a root node of the tree through one or more nodes to identify an entry that satisfies the search criterion. The techniques for traversing the rightmost path can include scanning a node by identifying the entries in the node of sufficient duration, and having a first value less than or equal to the ending point of the query interval, and selecting, from among the identified entries in the inner node, the entry having the largest of the first values. If the selected entry includes a pointer to a record in a database table, the techniques can include determining whether the interval of the selected entry satisfies the slot search criterion, and if so, identifying the selected entry as satisfying the search criterion. If the selected entry includes a pointer to a child node, the techniques can include traversing a path downwards to the child node, and repeating the scanning at the child node.

If none of the entries in the node are of sufficient duration and have a first value less than or equal to the ending point of the query interval, the techniques can include traversing a shortest direct path upwards, from the node towards the root node of the tree, through one or more ancestor nodes to identify the entries in an ancestor node having a second value less than or equal to the ending point of the query interval and having a third value greater than or equal to the duration of the query, and selecting, from among the identified entries in the ancestor node, the entry having the largest of the second values. If the selected entry includes a pointer to a record in a database table, the techniques can include determining whether the interval of the selected entry satisfies the slot search criterion, and if so, identifying the selected entry as satisfying the search criterion. If the selected entry includes a pointer to a child node, the techniques can include traversing a path downwards to the child node, and repeating the scanning at the child node.

To determine whether an entry is of sufficient duration, the techniques can include determining whether a value representing a difference between the ending point of the query interval and the first value of the entry is greater than or equal to the duration of the query.

The techniques can include scheduling an activity in at least a portion of an interval associated with the identified entry.

The techniques can include generating an entry based at least in part on the identified entry, deleting the identified entry, or changing a value of the identified entry.

Advantages that can be seen in particular implementations of the invention include one or more of the following. When a key and/or an entry of a node changes as a result of a scheduling of an activity, for example, only the subset of the database associated with that node and its ancestor nodes are locked for as long as is required to propagate the changes up the slot tree. This allows changes and updates to the tree to be made quickly. When a scan of the tree is performed by traversing a path from the root node through one or more nodes to identify an entry that satisfies the search criterion, the search engine backtracks over any given portion (i.e., between two nodes) of the path only once. The length of the traversed path is generally less than or equal to the height of the tree. If the slot tree is balanced, the slot tree can be searched in O(log(n)) steps (where n is the number of available slots) to identify the first entry (in the search direction) that satisfies the search criterion. One implementation includes all of the foregoing advantages.

The details of one or more examples are set forth in the accompanying drawings and the description below. Further features, aspects, and advantages of the invention will become apparent from the description, the drawings, and the claims.

DESCRIPTION OF DRAWINGS

FIG. 2 illustrates a graphical representation of a capacity profile for a resource.

FIG. 3 illustrates an example of a slot tree data structure.

FIG. 5 illustrates a graphical representation of a capacity profile for a resource.

FIG. 6 illustrates an example of a slot tree data structure.

DETAILED DESCRIPTION

Figure 1:
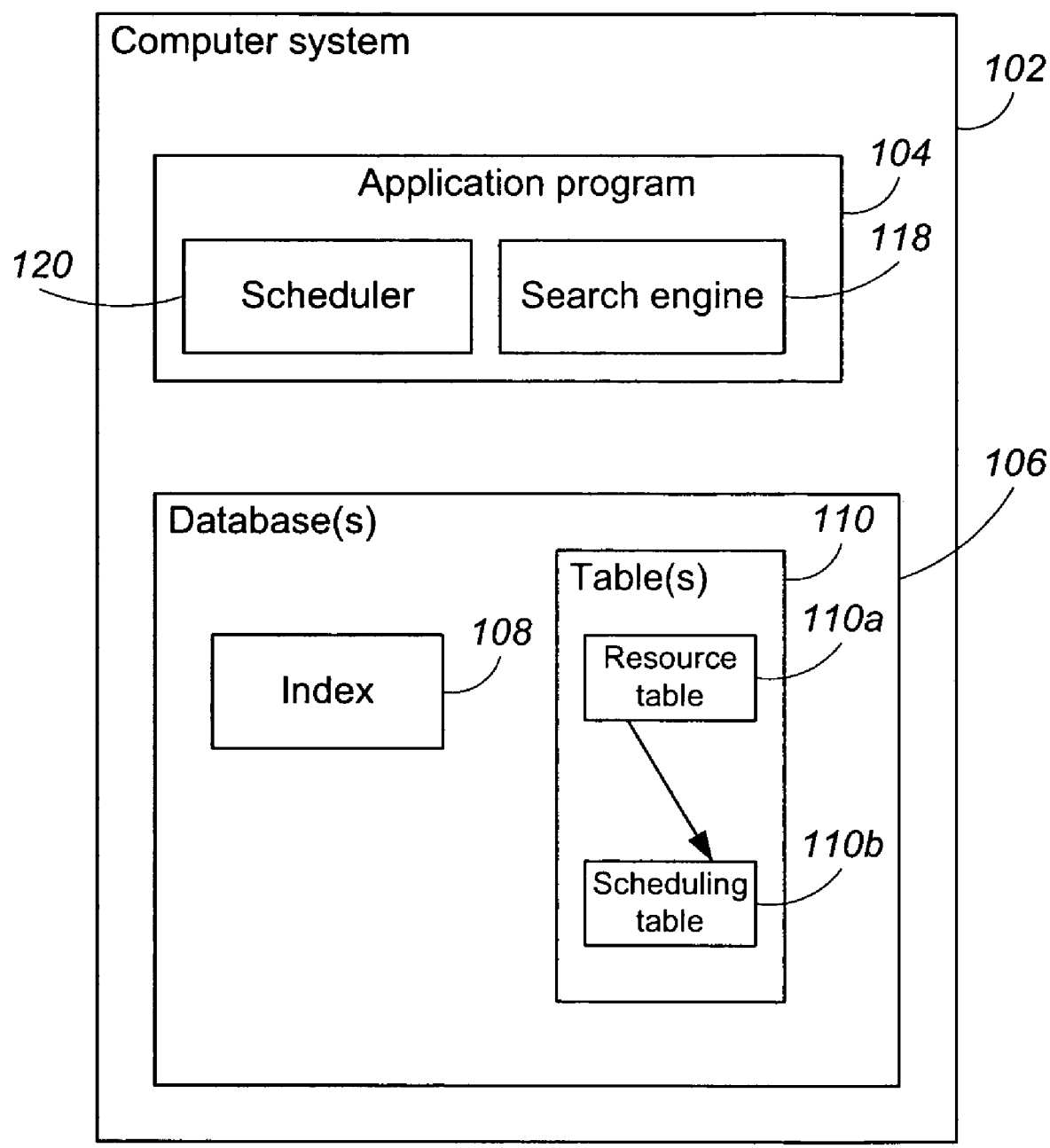
FIG. 1. illustrates a block diagram of a computing environment for indexing stored data using a slot tree data structure.

FIG. 1 shows a computing environment 100 in which a database may be implemented. A computer system 102 includes an application program 104, such as mySAP Supply Chain Management available from SAP AG of Walldorf (Baden), Germany. The application program 104 includes a search engine 118 that uses an indexing structure (referred to as a "slot tree") in accordance with the invention. The slot tree includes pointers to records stored in a table 110.

In one particular example, a company uses the application program 104 to manage resources, such as production facilities (e.g., processing units and storage resources of the company's manufacturing plant) and persons that are involved in a production process for the company. Each resource has a record in a resource table 110a that contains data in one of more columns. Examples of columns include a unique resource name, a resource type, a resource location, and capacity data for the resource.

The capacity data in each record of the resource table 110a includes a pointer to a scheduling table 110b stored in one or more pages of a storage medium (not shown). The scheduling table 110b is built incrementally as activities are scheduled to be performed by the resource. The scheduling table 110b may initially be empty or pre-populated with records of scheduled activities and available slots. A "scheduled activity" refers to a task that the resource has to perform during a particular time interval. An "available slot" is a time interval in which no activities have been scheduled. The term "time interval" refers to a period of time located between the occurrence of two events, e.g., a start event defined by a performance start time of the scheduled activity and an end event defined by a performance end event of the scheduled activity. Time intervals can span one or more consecutive time periods.

Each row of the scheduling table 110b is associated with a record of a scheduled activity or an available slot. A record identifier may uniquely identify each record in the scheduling table 110b. Each column of the scheduling table 110b is associated with a time period defined in terms of a particular unit of time specified by the application program 104 or a user, e.g., a minute, an hour, a day, a week, a month, or a year. Other units of time may also be used.

Each resource has a capacity to perform one or more scheduled activities during a given time period depending on each activity's capacity utilization and the resource's maximum capacity utilization. Capacity utilization is quantified using metrics, such as a time unit, or a volume unit. For example, a mixing activity on a mixing vessel resource may have a capacity utilization of one unit of mixing per day. If the mixing vessel resource has a maximum capacity utilization of three units of mixing per day, the company can schedule three mixing activities on that mixing vessel resource on any given day. In another example, a storage activity on a storage container resource has a capacity utilization of five tons. If the storage container resource has a maximum storage capacity utilization of eight tons, the company can schedule one or more additional activities having an aggregate capacity utilization of three tons on that storage container resource. Scheduling activities having capacity utilization that exceeds that of the resource's maximum capacity utilization results in an overload. Such overloading may be permitted by a manual override in response to a user input.

As shown in FIGS. 2 and 3, the application program 104 can be implemented to analyze data in the scheduling table 110b for the resource to generate a graphical representation of a capacity profile 200 (FIG. 2) for a resource over a given period of time. The capacity profile 200 includes scheduled activity information (represented by boxes with cross hash marks) and available slot information (represented by the white boxes 202a-202h) as shown in FIG. 2.

The application program 104 can also be implemented to analyze the data in the scheduling table 110b to generate an index 108 for the scheduling table 110b. The index 108 uses time interval data associated with the resource's available slots as a key. The available slots represent disjoint intervals in which activities can be scheduled. The index 108 can be organized as a modified B-tree having nodes ordered by increasing start time, as shown in FIG. 3, and referred to as a slot tree 300 having inner nodes 302, 304a-304c and leaf nodes 306a-306g. An inner node is a node in the slot tree 300 that has descendent nodes. A node with no descendent nodes is a leaf node. In the description to follow, the term "root node" refers to an inner node of the slot tree 300 that has no ancestor nodes, the term "branch node" refers to an inner node that has at least one ancestor node and at least one descendent node, the term "parent node" refers to a node's immediate ancestor node, and the term "child node" refers to a node's immediate descendent node.

A slot tree is a method of placing and locating records in a database. The slot tree 300 can be created and updated (e.g., through node splitting and the addition or deletion of node entries) in a manner similar to that of B-Trees. The first entry in the index 108 is a root node 302 of the slot tree 300. Subsequent entries in the index 108 include branch nodes 304a-304c and leaf nodes 306a-306g. The slot tree 300 is implemented as a balanced tree such that all leaf nodes 306a-306g are at the same depth, so retrieval of any record from anywhere in the index takes approximately the same amount of time.

Each leaf node 306a-306g of the slot tree 300 has one or more entries. Each entry of a leaf node represents an available slot (e.g., a white box in the capacity profile 200) in a resource's scheduling table 110b in which an activity may be scheduled. In one implementation, each entry of a leaf node is of the form $[p_{le}, s_{le}, e_{le}, d_{le}]$, where "$p_{le}$" represents a pointer to a record in a database table, the record defining an interval representing an available slot, "$s_{le}$" represents the starting point of the interval, "$e_{le}$" represents the ending point of the interval, "$d_{le}$" represents the duration of the interval. For example, the leaf node 306g has one entry $E_1$: [$RI_{202h}$, 1/31, 2/2, 2], and the leaf node 306f has two entries $E_1$: [$RI_{202f}$, 1/27, 1/28, 1] and $E_2$: [$RI_{202g}$, 1/29, 1/30, 1].

Each leaf node also has a key, generally of the form $[s_{lk}, e_{lk}, d_{lk}]$, where "$s_{lk}$" represents the starting point of an interval, "$e_{lk}$" represents the ending point of an interval, and "$d_{lk}$" represents the duration of an interval. In a leaf node having a single entry, the key reflects the starting point, ending point, and duration of a single interval associated with the single entry. For example, the leaf node 306g has a key K: [1/31, 2/2, 2]. In a leaf node having multiple entries, the key reflects a minimum of the starting points of the intervals in the entries of the leaf node, a maximum of the ending points of the intervals in the entries of the leaf node, and a maximum duration of the intervals in the entries of the leaf node. For example, the leaf node 306f has a key K: [1/27, 1/30, 1], where "1/27" represents the earlier of the two starting points "1/27" and "1/29" of the intervals in the entries of the leaf node 306f, "1/30" represents the later of the two ending points "1/28" and "1/30", and "1" represents the maximum duration of the intervals.

Each inner node (i.e., branch nodes 304a-304c and the root node 302) is a root node of a subtree of the slot tree 300. Each inner node has a key and one or more entries. In one implementation, each entry of an inner node represents a child node of the inner node, and is generally of the form $[p_{ie}, s_{ie}, e_{ie}, d_{ie}]$, where "$p_{ie}$" represents the pointer to the child node, "$s_{ie}$" represents a minimum of the starting points of intervals in a subtree having the child node as its root node, "$e_{ie}$" represents a maximum of the ending points of the intervals in the subtree having the child node as its root node, and "$d_{ie}$" represents a maximum duration of the intervals in the subtree having the child node as its root node. In other words, an entry of an inner node includes a pointer to a child node and the key of the child node. For example, the branch node 304c has two entries $E_1$: [$P_{306f}$, 1/27, 1/30, 1] and $E_2$: [$P_{306g}$, 1/31, 2/2, 2], representing the leaf node 306f and the leaf node 306g, respectively. The root node 302 has three entries $E_1$: [$P_{304a}$, 1/1, 1/22, 3], $E_2$: [$P_{304b}$, 1/23, 1/26, 1], and $E_3$: [$P_{304c}$, 1/27, 2/2, 2], representing the branch node 304a, the branch node 304b, and the branch node 304c, respectively.

In one implementation, the key of an inner node is generally of the form $[s_{ik}, e_{ik}, d_{ik}]$, where "$s_{ik}$" represents a minimum of the starting points of intervals in the corresponding subtree, "$e_{ik}$" represents a maximum of the ending points of the intervals in the corresponding subtree, and "$d_{ik}$" represents a maximum duration of the intervals in the corresponding subtree. For example, the branch node 304c has a key K: [1/27, 2/2, 2], where "1/27" represents the earliest of the starting points (i.e., 1/27, 1/29, 1/31) of the intervals in the leaf nodes 306f-306g, "2/2" represents the latest of the ending points (i.e., 1/28, 1/30, 2/2) of the intervals in the leaf nodes 306f-306g, and "2" represents a maximum duration of the intervals in the leaf nodes 306f-306g. Similarly, the root node 302 has a key K: [1/1, 2/2, 3], where "1/1" represents the earliest of the starting points (i.e., 1/1, 1/23, 1/27) of the intervals in the branch nodes 304a-304c, "2/2" represents the latest of the ending points (i.e., 1/22, 1/28, 2/2) of the intervals in the branch nodes 304a-304c, and "3" represents a maximum duration of the intervals in the branch nodes 304a-304c. Although only one level of branch nodes is shown in FIG. 3, the slot tree may be implemented with any number of branch node levels.

Figure 4A:
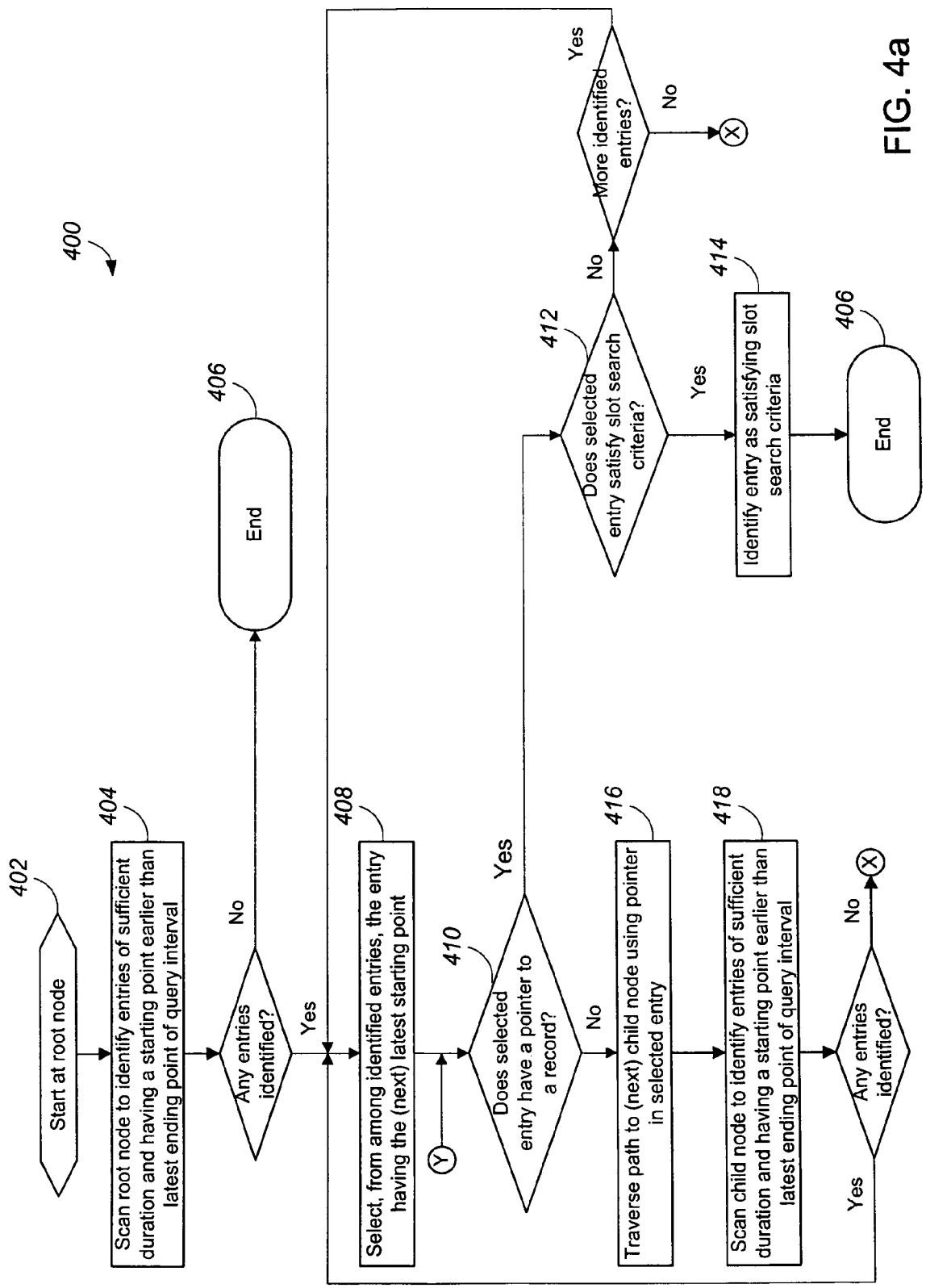
FIGS. 4a and 4b are flow diagrams illustrating a method for performing a slot search process by traversing a rightmost path of a slot tree data structure.
Figure 4B:
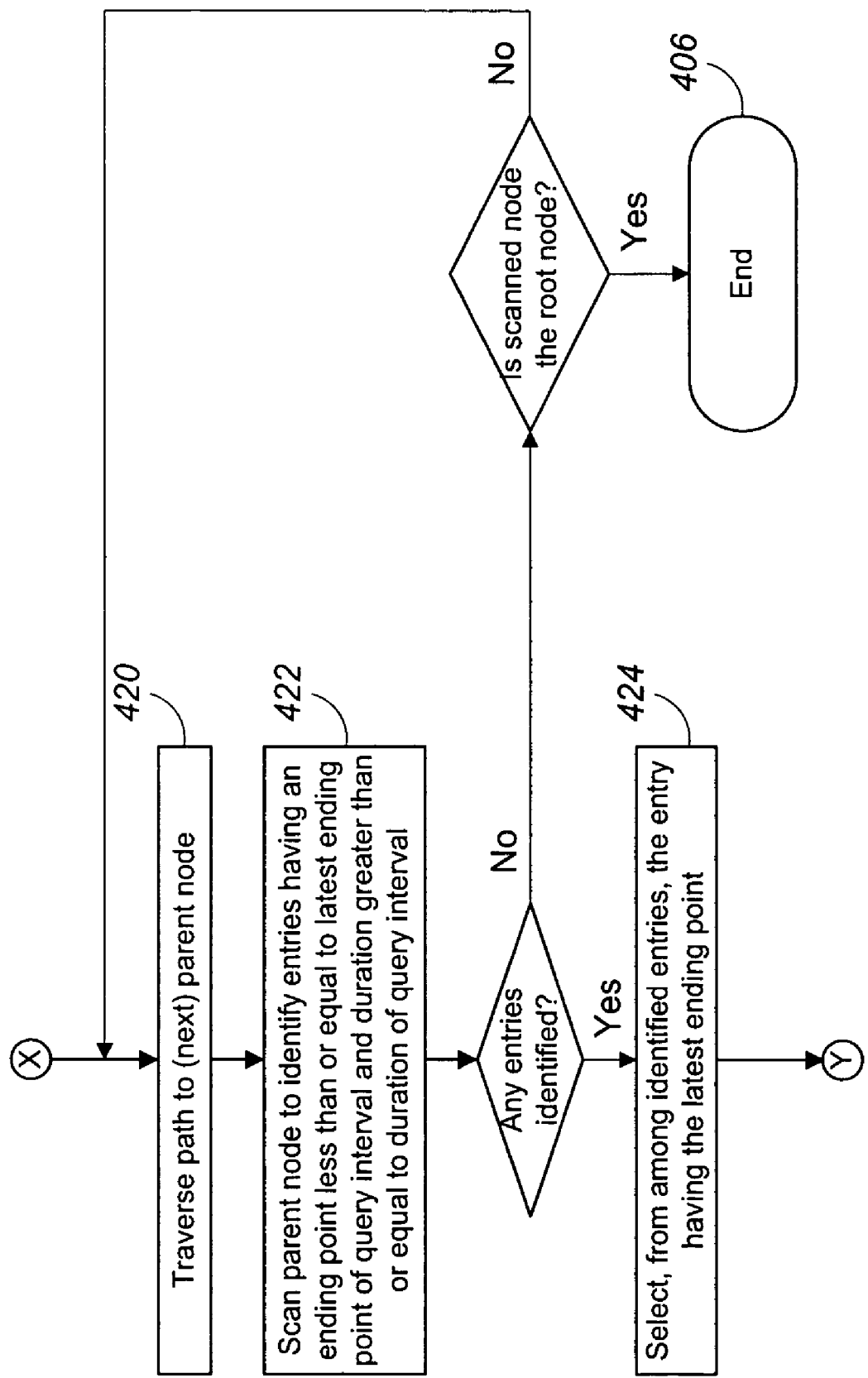

FIGS. 4a and 4b shows a search process (400) implemented by a search engine 118 of the application program 104 to traverse a rightmost path of the slot tree 300. The search process (400) scans nodes along the traversed path to search for an entry that satisfies slot search criteria. The slot search criteria include a duration of a query, and may include some combination of an earliest starting time, a latest starting time, an earliest ending time, a latest ending time, and a search direction.

The path traversed in the slot tree 300 by the search engine 118 is related to the search direction specified by the slot search criteria. For example, the search engine 118 traverses a leftmost path down from the root node 302 of the slot tree 300 through one or more nodes if the slot search criteria specifies a forward search direction, and traverses a rightmost path if the slot search criteria specify a backward search direction. Although the slot search process (400) is described in terms of identifying the first entry in the search direction that satisfies the slot search criteria, the slot search process (400) can be performed on a slot tree to identify multiple or all entries that satisfy the slot search criteria.

The search engine 118 starts (402) the slot search process (400) at the root node 302. Including a key in the root node 302 advantageously allows the search engine 118 to determine whether there is at least one entry in the slot tree 300 that may satisfy the slot search criteria without having to perform a scan of the slot tree 300 down to the individual entries. In this case, the key K: [1/1, 2/2, 3] of the root node 302 indicates that there may exist at least one entry that satisfies a slot search criteria [$e_{latest}$: 1/31, $d_q$: 2 days, search direction: backwards], where "$e_{latest}$" represents the latest ending time of a query interval and "$d_q$" represents a duration of a query.

The search engine 118 performs a scan of the slot tree 300 by traversing a rightmost path (because the search direction is backwards) down the slot tree 300 to identify the first entry (if one exists) that satisfies a slot search criteria. The path is formed by scanning each inner node to determine which node to proceed to. For example, the search engine 118 scans (404) the root node 302 to identify the entries in the root node 302 of sufficient duration (i.e., $e_{latest} - s_{ie} \geq d_q$) and having a starting point that is earlier than the latest ending point of the query interval (i.e., $s_{ie} \leq e_{latest}$). In the example of FIG. 3, the search engine 118 identifies two entries of the root node 302: $E_1$ and $E_3$ representing the branch nodes 304a and 304c, respectively. In other examples in which none of the entries of the root node 302 are identified by the search engine 118, the search engine 118 terminates (406) the slot search process (400).

The search engine 118 then selects (408), from among the identified entries, the entry having the latest starting point (i.e., the largest $s_{ie}$), and examines the selected entry to determine (410) whether it has a pointer to a child node or a pointer to a record. If the selected entry includes a pointer to a record, the search engine 118 examines the selected entry to determine (412) whether its interval satisfies the slot search criteria.

If the interval of the entry selected in 408 satisfies the slot search criteria, the search engine 118 identifies (414) the entry as being the first entry in the slot tree 300 to satisfy the slot search criteria, and terminates (406) the slot search process (400). If the interval of the entry selected in 408 does not satisfy the slot search criteria, and at least one other entry was identified at 404, the search engine 118 repeats the process (400) at 408, this time selecting, from among the remaining identified entries, the entry having the next latest starting point.

In the example of FIG. 3, the search engine 118 selects the entry $E_3$ representing the branch node 304c, and uses the pointer in the entry $E_3$ to traverse (416) a path downwards from the root node 302 to the branch node 304c.

The search engine 118 then scans the branch node 304c to identify (418) the entries of sufficient duration (i.e., $e_{latest} - s_{ie} \geq d_q$) and having a starting point that is earlier than the latest ending point of the query interval (i.e., $s_{ie} \leq e_{latest}$). In the example of FIG. 3, although both of the entries $E_1$: [$P_{306f}$, 1/27, 1/30, 1] and $E_2$: [$P_{306g}$, 1/31, 2/2, 2] of the branch node 304c have starting points that are earlier than the latest ending point of the query interval, neither of the entries are of sufficient duration.

Accordingly, the search engine 118 backtracks by traversing (420) a path upwards through one or more ancestor nodes towards the root node 302. In this case, because the branch node 304c has only one ancestor node, i.e., the root node 302, the search engine 118 traverses a path directly to the root node 302 and performs a scan of the root node to identify (422) the entries in the root node 302 having an ending point less than or equal to the ending point of the query interval (i.e., $e_{ie} \leq e_{latest}$), and having a duration greater than or equal to the duration of the query (i.e., $d_{ie} \geq d_q$). In other examples in which there is at least one inner node between the node being scanned ("node X") and the root node, the search engine 118 traverses the shortest direct path upwards, from the node X towards the root node of the tree, through one or more ancestor nodes of node X to identify one or more entries of an ancestor node having an ending point less than or equal to the ending point of the query interval (i.e., $e_{ie} \leq e_{latest}$), and having a duration greater than or equal to the duration of the query (i.e., $d_{ie} \geq d_q$). If the search engine 118 traverses the path all the way back to the root node of the slot tree, and none of the nodes along the traversed path have an ending point less than or equal to the ending point of the query interval (i.e., $e_{ie} \leq e_{latest}$), and a duration greater than or equal to the duration of the query (i.e., $d_{ie} \geq d_q$), the search engine 118 terminates (406) the slot search process (400) because the slot tree 300 does not contain a single entry that satisfies the slot search criteria.

In the example of FIG. 3, only the entry $E_1$ representing the branch node 304a is identified by the search engine 118. In other examples in which multiple entries are identified, the search engine 118 selects (424), from among the identified entries, the entry having the latest ending point (i.e., the largest $e_{ie}$).

The search engine 118 examines the entry $E_1$ in the root node 302 to determine (return to 410) whether it has a pointer to a child node or a pointer to a record. In this case, because the entry $E_1$ includes a pointer to a child node, i.e., the branch node 304a, the search engine 118 uses the pointer in the selected entry $E_1$ to traverse (416) a path downwards from the root node 302 to the branch node 304a.

The search engine 118 scans (418) the branch node 304a to identify the entries of sufficient duration (i.e., $e_{latest} - s_{ie} \geq d_q$) and having a starting point that is earlier than the latest ending point of the query interval (i.e., $s_{ie} \leq e_{latest}$). In the example of FIG. 3, only the entry $E_1$ representing the leaf node 306a is identified by the search engine 118. The process (400) returns to 408. The search engine 118 examines (410) the selected entry $E_1$ and uses the pointer in the selected entry $E_1$ to traverse (416) a path downwards from the branch node 304a to the leaf node 306a.

The search engine 118 scans (418) the leaf node 306a to identify the entries of sufficient duration (i.e., $e_{latest} - s_{ie} \geq d_q$) and having a starting point that is earlier than the latest ending point of the query interval (i.e., $s_{ie} \leq e_{latest}$). In the example of FIG. 3, the search engine 118 identifies the entry $E_1$: [$RI_{202a}$, 1/1, 1/4, 3] and examines the entry $E_1$ of the leaf node 306a to determine (412) whether it satisfies the slot search criteria. Because the entry $E_1$ of the leaf node 306a satisfies the slot search criteria, the search engine 118 identifies (414) the entry $E_1$ as being the first entry in the slot tree 300 to satisfy the slot search criteria, and terminates (406) the slot search process (400).

In other examples in which the leaf node has multiple entries, the search engine 118 scans (418) the leaf node to identify the entries of sufficient duration (i.e., $e_{latest} - s_{ie} \geq d_q$) and having a starting point that is earlier than the latest ending point of the query interval (i.e., $s_{ie} \leq e_{latest}$). If multiple entries are identified, the search engine 118 selects (return to 408), from among the identified entries in the leaf node, the entry having the latest starting point (i.e., the largest $e_{ie}$), and examines the selected entry to determine (412) whether it satisfies the slot search criteria. If the selected entry satisfies the slot search criteria, the search engine 118 identifies (414) the selected entry as being the first entry in the slot tree 300 to satisfy the slot search criteria, and terminates (406) the slot search process (400). If the selected entry does not satisfy the slot search criteria, the search engine 118 selects (return to 408), from among the remaining identified entries, the entry having the next latest starting point and repeats the process (400) at 408.

In one implementation, a scheduler 120 of the application program 104 takes an action (e.g., schedules an activity) with respect to the entry ("identified entry") identified during the slot search process (400). As can be seen from the capacity profile 200 (FIG. 2), the available slot 202a represented by the identified entry $E_1$: [$RI_{202a}$, 1/1, 1/4, 3] spans a duration of 3 days (i.e., 1/1, 1/2 and 1/3). The scheduler 120 may be configured to take an action with respect to the identified entry, for example, automatically scheduling an activity for the earliest portion of the available slot moving backwards in time (in this case, the 1/2-1/4 portion of the available slot). Optionally, the scheduler 120 provides, e.g., through a graphical user interface (GUI), information identifying the portions of the available slot to a user and schedules the activity for one of the portions of the available slot in response to user input.

Once the activity has been scheduled, e.g., in the 1/2-1/4 portion of the available slot 202a (FIG. 2), the application program 104 updates the data at the scheduling table 110b location defined by the pointer in the identified entry. This update is reflected in the available slot information (represented by the white boxes 502a, and 202b-202h) of the capacity profile 500 of the resource, as shown in FIG. 5. Generally, if an entry in a node changes as a result of a scheduling of an activity, the key of the node changes as well. All corresponding changes to entries and keys of nodes are propagated upwards. Only the subset of the database associated with the node having the initial entry change and its ancestor nodes are locked for as long as is required to propagate the changes up the slot tree. For example, the entry in the leaf node 606 changed from $E_1$: [$RI_{202a}$, 1/1, 1/4, 3] (FIG. 3) to $E_1$: [$RI_{502a}$, 1/1, 1/2, 1] (FIG. 6) as a result of a scheduling of an activity in the 1/2-1/4 portion of the available slot 202a (FIG. 2). The key of the leaf node 606 reflects the change in the entry $E_1$ of the leaf node 606. The entry $E_1$ and the key K of the branch node 604, as well as the entry $E_1$ and the key K of the root node 602 also reflect the change in the entry $E_1$ of the leaf node 606, as shown in the slot tree 600 of FIG. 6.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results.

For example, the slot tree can be implemented as a modified Red-Black Tree, a modified B*-Tree, or as a modification of any other tree, as long as (1) the nodes of the slot tree have keys of the form [s, e, d], and (2) any invariant on the slot tree is maintained after an operation (e.g., an insertion or deletion of a node) on the slot tree is performed. In an example in which the slot tree is implemented as a modified Red-Black Tree, an inner node itself can include one entry representing an available slot in a resource's scheduling table, and zero, one or two entries representing child nodes.

The search engine 118 may be implemented to terminate the slot search process upon identification of the first entry (e.g., in the search direction) representing an available slot in which an activity may be scheduled, upon identification of a pre-determined number of entries, or upon identification of all entries in the slot tree that satisfy the slot search criteria.

If the slot search criteria defines a duration of a query ("$d_q$"), a starting point ("$s_q$") of a query interval and a forward search direction, the search engine 118 performs a scan of a slot tree by traversing a leftmost path down the slot tree 300 to identify the first entry that satisfies a slot search criteria. In such an example, the search engine 118 progresses down the slot tree by scanning each node along the path.

The search engine scans a node by identifying the entries in the node of sufficient duration (i.e., $e_{ie}-s_q \geq d_q$), and having an ending point greater than or equal to the starting point of the query interval (i.e., $e_{ie} \geq s_q$). The search engine 118 selects, from among the identified entries in the scanned node, the entry having the earliest of the ending points (i.e., the smallest $e_{ie}$).

If the selected entry in the scanned node includes a pointer to a child node, the search engine 118 uses the pointer to traverse a path downwards to the child node, and scans the child node as described above. If the selected entry includes a pointer to a record in a database table, the search engine 118 determines whether the interval of the selected entry satisfies the slot search criteria, and if so, identifies the selected entry as satisfying the search criterion. If the interval of the selected entry does not satisfy the slot search criteria, the search engine 118 determines whether the interval of the entry having the next earliest ending point satisfies the search criterion. This process is repeated either until an entry in the scanned node is identified as satisfying the search criteria, or all of the entries in the scanned node have been examined. If all of the entries in the scanned node have been examined and not one of them satisfies the search criteria, the search engine 118 traverses an upwards path through one or more ancestor nodes of the scanned node.

At each ancestor node along the traversed path, the search engine identifies the entries having a starting point greater than or equal to the starting point of the query interval (i.e., $s_{ie} \geq s_q$) and a duration greater than or equal to the duration of the query (i.e., $d_{ie} \geq d_q$). The search engine then selects, from among the identified entries in the scanned ancestor node, the entry having the earliest of the starting points (i.e., the smallest $s_{ie}$). If the selected entry includes a pointer to a child node, the search engine traverses a path downwards to the child node, and scans the child node as described above. If the selected entry includes a pointer to a record in a database table, the search engine 118 determines whether the interval of the selected entry satisfies the slot search criteria, and if so, identifies the selected entry as satisfying the search criterion. If the interval of the selected entry does not satisfy the slot search criteria, the search engine 118 determines whether the interval of the entry having the next earliest starting point satisfies the search criterion. This process is repeated either until an entry in the scanned ancestor node is identified as satisfying the search criterion, or all of the entries in the scanned ancestor node have been examined. If all of the entries in the scanned ancestor node have been examined and not one of them satisfies the search criteria, the search engine 118 traverses an upwards path to the next ancestor node. If the search engine 118 traverses the path all the way back to the root node of the slot tree, and none of the entries of the ancestor nodes along the traversed path have a starting point greater than or equal to the starting point of the query interval (i.e., $s_{ie} \geq s_q$) and a duration greater than or equal to the duration of the query (i.e., $d_{ie} \geq d_q$), the search engine 118 terminates the slot search process because the slot tree does not contain a single entry that satisfies the slot search criteria.

What is claimed is:

1. A computer program product, tangibly embodied in a computer readable storage medium, the computer program product to cause a data processing apparatus to:
   provide a data structure embodied in a computer-readable medium, the data structure implementing a tree of nodes having a plurality of inner nodes and a plurality of leaf nodes,
   each leaf node including a key having a first value representing a starting point of an interval, a second value representing an ending point of the interval, and a third value representing a duration of the interval, and
   each inner node being a root node of a subtree, each inner node including a second key having a first value representing a minimum of the starting points of different intervals in the corresponding subtree, a second value representing a maximum of the ending points of the different intervals in the corresponding subtree, and a third value representing a duration of the longest single interval selected from the different intervals in the corresponding subtree.

2. The computer program product of claim 1, wherein each node includes one or more entries, each entry comprising:
   a pointer to a record in a database table, the record defining a particular interval, a first value representing a starting point of the particular interval, a second value representing an ending point of the particular interval, and a third value representing a duration of the particular interval; or
   a pointer to a child node, a first value representing a minimum of the starting points of different intervals in a subtree having the child node as a root node of the subtree, a second value representing a maximum of the ending points of the different intervals in the subtree having the child node as the root node of the subtree, and a third value representing a duration of the longest single interval selected from the different intervals in the subtree having the child node as the root node of the subtree.

3. The computer program product of claim 2, wherein each record defines an interval representing an available slot in a capacity profile of a resource.

4. The computer program product of claim 2, further comprising instructions to:
   perform a scan of the data structure to identify an entry that satisfies a search criterion.

5. The computer program product of claim 4, further comprising instructions to:
   schedule an activity in at least a portion of an interval associated with the identified entry.

6. The computer program product of claim 5, further comprising instructions to:
   generate a second entry based at least in part on the identified entry, delete the identified entry, or change a value of the identified entry.

7. The computer program product of claim 4, wherein the search criterion comprises one or more of a duration of a query, an earliest starting point of a query interval, a latest starting point of the query interval, an earliest ending point of the query interval, a latest ending point of the query interval, and a search direction.

8. The computer program product of claim 4, wherein the search criterion comprises a duration of a query, a starting point of a query interval and a forward search direction, and wherein instructions to perform the scan comprise instructions to:

traverse a leftmost path from a root node of the tree through one or more nodes to identify an entry that satisfies the search criterion.

9. The computer program product of claim 8, wherein instructions to traverse the leftmost path comprise instructions to:
scan a node by:
identifying the entries in the node of a first duration, and having a second value greater than or equal to the starting point of the query interval;
selecting, from among the identified entries in the node, the entry having the smallest of the second values; and
if the selected entry includes a pointer to a record in a database table, determining whether the interval of the selected entry satisfies the slot search criterion, and if so, identifying the selected entry as satisfying the search criterion, and
if the selected entry includes a pointer to a child node, traversing a path downwards to the child node, and repeating the scanning at the child node.

10. The computer program product of claim 9, wherein if none of the entries in the node are of said first duration and have a second value greater than or equal to the starting point of the query interval, the computer program product further comprises instructions to:
traverse a shortest direct path upwards, from the node towards the root node of the tree, through one or more ancestor nodes to identify one or more entries of an ancestor node having a first value greater than or equal to the starting point of the query interval and a third value greater than or equal to the duration of the query;
select, from among the identified entries in the ancestor node, the entry having the smallest of the first values; and
if the selected entry includes a pointer to a record in a database table, determine whether the interval of the selected entry satisfies the slot search criterion, and if so, identify the selected entry as satisfying the search criterion, and
if the selected entry includes a pointer to a child node, traverse a path downwards to the child node, and repeat the scanning at the child node.

11. The computer program product of claim 9, further comprising instructions to:
determine whether an entry is of said first duration by determining whether a value representing a difference between the second value of the entry and the starting point of the query interval is greater than or equal to the duration of the query.

12. The computer program product of claim 4, wherein the search criterion comprises a duration of a query, an ending point of a query interval and a backward search direction, and wherein the instructions to perform the scan comprise instructions to:
traverse a rightmost path from a root node of the tree through one or more nodes to identify an entry that satisfies the search criterion.

13. The computer program product of claim 12, wherein instructions to traverse the rightmost path comprise instructions to:
scan a node by:
identifying the entries in the node of a first duration, and having a first value less than or equal to the ending point of the query interval;
selecting, from among the identified entries in the node, the entry having the largest of the first values; and
if the selected entry includes a pointer to a record in a database table, determining whether the interval of the selected entry satisfies the slot search criterion, and if so, identifying the selected entry as satisfying the search criterion, and
if the selected entry includes a pointer to a child node, traversing a path downwards to the child node, and repeating the scanning at the child node.

14. The computer program product of claim 13, wherein if none of the entries in the node are of said first duration and have a first value less than or equal to the ending point of the query interval, the computer program product further comprises instructions to:
traverse a shortest direct path upwards, from the node towards the root node of the tree, through one or more ancestor nodes to identify the entries in an ancestor node having a second value less than or equal to the ending point of the query interval and having a third value greater than or equal to the duration of the query;
select, from among the identified entries in the ancestor node, the entry having the largest of the second values; and
if the selected entry includes a pointer to a record in a database table, determine whether the interval of the selected entry satisfies the slot search criterion, and if so, identify the selected entry as satisfying the search criterion, and
if the selected entry includes a pointer to a child node, traverse a path downwards to the child node, and repeat the scanning at the child node.

15. The computer program product of claim 13, further comprising instructions to:
determine whether an entry is of said first duration by determining whether a value representing a difference between the ending point of the query interval and the first value of the entry is greater than or equal to the duration of the query.

16. A computer-implemented method to schedule use of resources comprising:
providing a data structure embodied in a computer-readable storage medium, the data structure implementing a tree of nodes having a plurality of inner nodes and a plurality of leaf nodes,
each leaf node including a key having a first value representing a starting point of an interval, a second value representing an ending point of the interval, and a third value representing a duration of the interval, and
each inner node being a root node of a subtree, each inner node including a second key having a first value representing a minimum of the starting points of different intervals in the corresponding subtree, a second value representing a maximum of the ending points of the different intervals in the corresponding subtree, and a third value representing a duration of the longest single interval selected from the different intervals in the corresponding subtree.

17. The method of claim 16, further comprising:
performing a scan of the data structure to identify an entry that satisfies a search criterion.

18. The method of claim 16, wherein each node includes one or more entries, each entry comprising:
a pointer to a record in a database table, the record defining a partial interval, a first value representing a starting point of the particular interval, a second value representing an ending point of the particular interval, and a third value representing a duration of the particular interval; or a pointer to a child node, a first value representing a minimum of the starting points of different intervals in a subtree having the child node as a root node of the subtree, a second value representing a maximum of the ending points of the different intervals in the subtree having the child node as the root node of the subtree, and a third value representing a duration of the longest single interval selected from the different intervals in the subtree having the child node as the root node of the subtree.

19. An apparatus to schedule use of resources comprising:
a data structure embodied in a computer-readable storage medium, the data structure implementing a tree of nodes having a plurality of inner nodes and a plurality of leaf nodes,
each leaf node including a key having a first value representing a starting point of an interval, a second value representing an ending point of the interval, and a third value representing a duration of the interval, and
each inner node being a root node of a subtree, each inner node including a second key having a first value representing a minimum of the starting points of different intervals in the corresponding subtree, a second value representing a maximum of the ending points of the different intervals in the corresponding subtree, and a third value representing a duration of the longest single interval selected from the different intervals in the corresponding subtree.

20. The apparatus of claim 19, wherein a scan of the data structure is performed to identify an entry that satisfies a search criterion.

* * * * *